(12) United States Patent
Snider

(10) Patent No.: US 6,771,402 B2
(45) Date of Patent: Aug. 3, 2004

(54) METHOD AND APPARATUS FOR GENERATING A HOLOGRAM

(75) Inventor: Gregory S. Snider, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/964,532

(22) Filed: Sep. 28, 2001

(65) Prior Publication Data

US 2003/0063339 A1 Apr. 3, 2003

(51) Int. Cl.⁷ .................................................. G03H 1/08
(52) U.S. Cl. .............................. 359/9; 359/1; 359/22; 382/232; 348/40
(58) Field of Search ................... 359/9, 1, 22; 382/232; 348/40

(56) References Cited

U.S. PATENT DOCUMENTS

| | | | |
|---|---|---|---|
| 5,194,971 A | * 3/1993 | Haines | 359/9 |
| 5,668,648 A | * 9/1997 | Saito et al. | 359/9 |
| 6,366,368 B1 | * 4/2002 | Horimai | 359/9 |

OTHER PUBLICATIONS

Mark Lucente, "Holographic Bandwidth Compression Using Spatial Subsampling", Optical Engineering, Jun. 1996, pp. 1–25.

M. Lucente, "Computational Holographic Bandwidth Compression", IBM Systems Journal, vol. 35, No. 3&4, 1996, pp. 1–17.

Mark Lucente, "Optimization of Hologram Computation For Real–Time Display", SPIE Proceeding #1667 "Practical Holograph VI", Feb. 1992, pp. 1–6.

* cited by examiner

Primary Examiner—Fayez Assaf

(57) ABSTRACT

A method and system for generating a hologram include a computer (104) connected to a printer (108). A mathematical description (102) of an object, including for example the physical dimensions of the object, is provided to the computer (104). The computer (104) computes a holographic interference pattern based on the mathematical description (102) of the object, and than transmits the computed holographic interference pattern data (106) to the printer (108). The printer (108) prints or otherwise fixes the holographic interference pattern to a print medium (107) to produce a holograph (110). A holographic (three-dimensional) image (114) of the object can then be produced by directing a light beam (118) from a light source (112) onto a surface of the hologram (110), so that the light will interfere with the pattern to generate the holographic image (114).

11 Claims, 3 Drawing Sheets

METHOD AND APPARATUS FOR GENERATING A HOLOGRAM

BACKGROUND OF THE INVENTION

1. Field of the Invention

The invention relates to the field of holography.

2. Background Information

Holograms are typically created by directing laser light toward a three-dimensional physical object. More particularly, light from a visible spectrum laser is split into two beams, a first of which is directed onto a photosensitive medium, and the second of which is directed toward the object. The photosensitive medium is placed near the object, so that light from the second beam that is reflected by the object will strike the medium. The direct light from the first beam and the reflected light from the second beam combine and interfere to produce an interference pattern on the photosensitive medium.

After the exposure process is complete, the photosensitive medium is developed to fix the interference pattern on and/or in the photosensitive medium. The developed medium can then be used to generate a three dimensional image of the object by directing a beam of coherent light onto the medium so that the interference pattern fixed in the medium can alter the beam to generate the image. This beam is preferably a) coherent and b) has a wavelength that is the same or similar to the wavelength of the coherent light used to initially generate the interference pattern. The interference pattern may have lines that are separated only by several wavelengths of the light used to generate the interference pattern.

The resolution and technical limitations of available photosensitive media, can result in a relatively long exposure time to capture the holographic interference pattern. The average exposure necessary to capture a holographic interference pattern with a photosensitive medium can range, for example, from about a second to about a minute. This long exposure time, coupled with the fine resolution of the interference pattern means that the process of capturing a holographic interference pattern with a photosensitive medium is sensitive to vibration. Thus, intricate and massive arrangements are often used to capture a holographic interference pattern with a high degree of quality. For example, the object to be holographed, a laser and beam splitting mechanism, and the photosensitive medium are often placed together on an isolation table such as a granite slab weighing hundreds or thousands of pounds.

In sum, the process of a) generating a holographic interference pattern using a first portion of coherent light that is reflected from an object and a second portion of the coherent light provided as an off-axis beam, and then b) accurately capturing and then fixing the pattern in a photosensitive medium suitable for later generating a holographic image of an object upon exposure to an appropriate light source, is often cumbersome, resource-intensive and expensive.

However, the three dimensional nature of holographic images can be very useful in a variety of contexts. For example, in a scientific, engineering or business presentation a holographic three dimensional model can be advantageously used to quickly and clearly convey information and understanding to an audience.

Accordingly, a need exists for a method and apparatus that can easily, accurately and inexpensively generate and capture holographic interference patterns and generate corresponding holographic images.

SUMMARY OF THE INVENTION

In accordance with exemplary embodiments of the invention, a method and apparatus are provided for accurately and inexpensively generating a holographic interference pattern based on a mathematical description of an object, fixing the interference pattern in a medium, such that a three dimensional holographic image of the object can be generated using the medium. In accordance with an exemplary embodiment of the invention, a method for storing a holographic interference pattern includes the steps of a) computing the holographic interference pattern based on a mathematical description of an object, and b) forming a medium including the interference pattern. The interference pattern modifies incident light so that the modified light includes a holographic image of the object.

For example, the holographic image can be generated by directing at least one beam of light onto a surface of the medium to modify the beam of light with the interference pattern, the modified beam comprising the holographic image. The incident light or at least one beam of light directed onto the surface of the medium can be coherent light. The step of computing can use quantum electrodynamics. In accordance with an exemplary embodiment of the invention, the computed interference pattern can be partitioned and each partition can be represented as a weighted sum of basis interference patterns. A suitable means such as a digital computer or any other appropriate processing device can be provided for computing the interference pattern based on the mathematical description of the object. A suitable means for forming the medium including the interference pattern is provided, and can include a printer having a sufficiently high resolution to print the computed interference pattern onto a suitable medium, for example a transparent medium. A means for generating the image using the medium including the interference pattern is provided, and can include at least one light source, for example a laser device emitting coherent light.

BRIEF DESCRIPTION OF THE DRAWINGS

Other objects and advantages of the present invention will be apparent to those skilled in the art from the following detailed description of preferred embodiments, when read in conjunction with the accompanying drawings wherein like elements have been designated with like reference numerals and wherein.

DETAILED DESCRIPTION OF THE PREFERRED EMBODIMENTS

Figure 1:
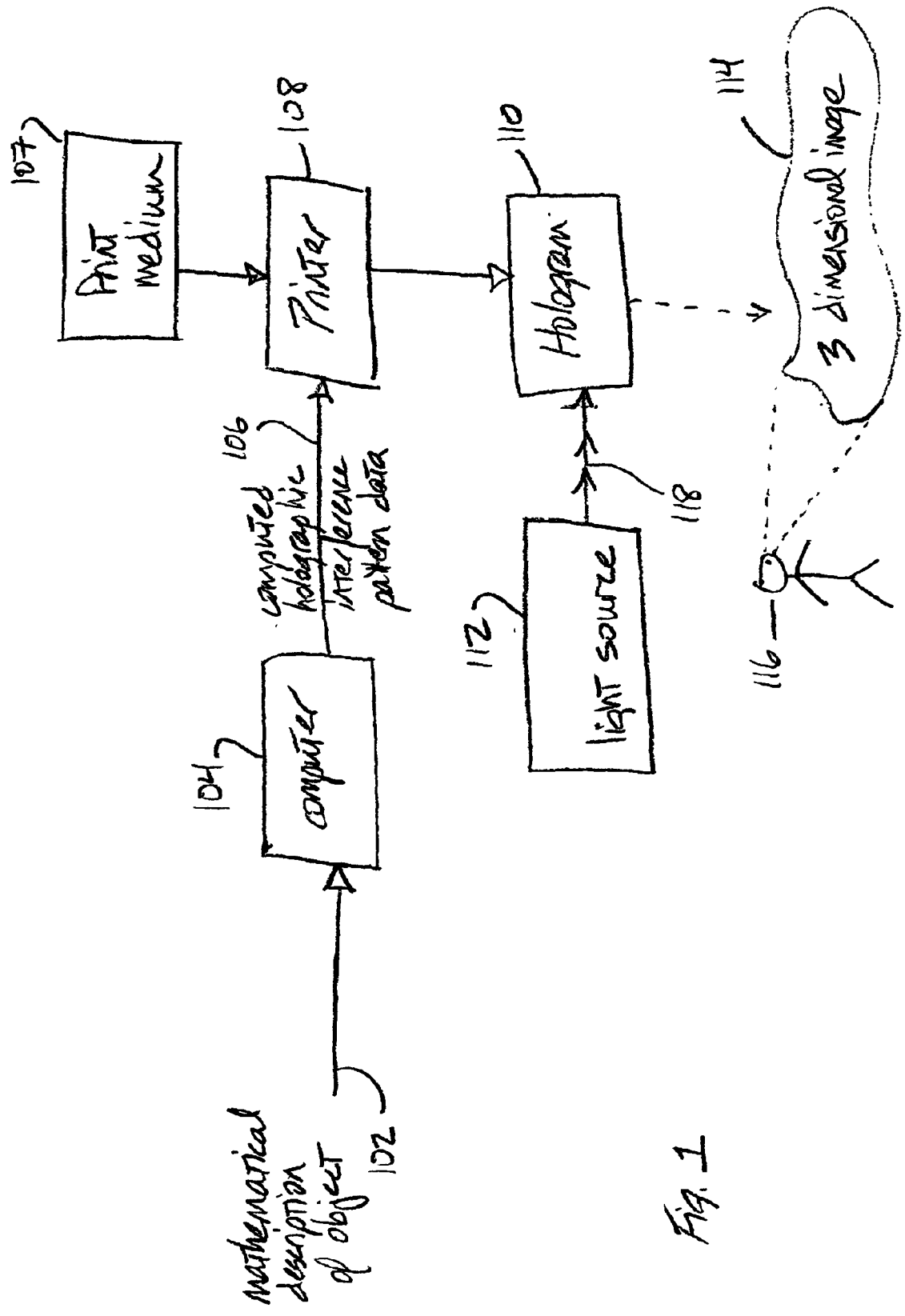
FIG. 1 shows a block diagram of an exemplary embodiment of the invention.

In accordance with the invention, a method and apparatus are provided for generating and storing a holographic interference pattern, as shown for example in FIG. 1. As indicated in FIG. 1, a mathematical description 102 of an object is provided to a computer 104. The computer 104 uses the mathematical description of the object to compute an interference pattern that can be used to create a holographic image of the object. The mathematical description can disclose or describe the external shape of the object, for example by including an appropriate listing of three-dimensional Cartesian coordinates. The mathematical description can also, for example, be a description of the object in a CAD-CAM descriptive language, or in a format consistent or compatible with standards or descriptive languages known in the CAD-CAM arts. The mathematical description can be any appropriate description that reflects or describes the dimensions or shape of the object. The computer 104 can be implemented using any suitable computing device for example an electronic digital computer, an microprocessor, or any other digital or analog computing device capable of preforming the necessary computations to compute a holographic interference pattern based on the description of the object provided to the computing device.

Specific algorithms for computing a holographic interference pattern based on a mathematical, e.g., three-dimensional description of the object are known, and are not further discussed here. See, for example, 1) "*Optimization of Hologram Computation for Real-Time Display*", Mark Lucente, published in SPIE Proceeding #1667 "Practical Holography VI" (SPIE, Bellingham, Wash., February 1992); 2) "*Holographic Bandwidth Compression Using Spatial Subsampling*", Mark Lucente, published in Optical Engineering, Special Section on Electronic Holography, June 1996; and 3) "*Computational Holographic Bandwidth Compression*", Mark Lucente, published in IBM Systems Journal, Vol. 35, No. 3&4, 1996. These articles are hereby incorporated by reference.

As shown in FIG. 1, the computed holographic interference pattern data 106 are output from the computer 104 and provided to a printer 108. The printer 108 also receives a print medium 107. The printer 108 uses the print medium 107 and the computed holographic interference pattern data 106 to print or fix the holographic interference pattern onto or into the print medium, to generate a hologram 110. When a light source 112 directs a light beam 118 onto the hologram 110, the interference pattern of the hologram 110 modifies the light from the light beam 118 to produce a 3-dimensional image 114 of the object, that can be directly viewed by a person 116 when the light is in the visible spectrum. In other words, the light beam 118 interferes with the interference pattern of the hologram 110, and is bent and modified to form the three dimensional image 114.

The print medium 107 is preferably transparent, and can be transparent at least in part. The printer 108 can deposit ink or other pigment onto the print medium 107 to form the interference pattern. The print medium 107 can be transparent to the light in the light beam 118 and the ink or pigment can be non-transparent or translucent to the light beam 118. Any appropriate method or technique for fixing the computed holographic interference pattern onto or into the print medium can be used. For example, technologies and techniques for creating semiconductor microcircuit masks, can be easily adapted and used in the present invention.

Preferably, the light beam 118 is coherent and the light source 112 is a laser. The computation of the holographic interference pattern by the computer 104 can also take into account the wavelength of coherent light that will be used to later generate the three dimensional image of the object using the hologram 110, so that the interference pattern of the hologram 110 is well matched or suited for the particular wavelength of the light beam 118.

Those of ordinary skill in the art will recognize that various types and kinds of holograms are known and available, including those which do not strictly require a coherent light source and/or a light source having a specific wavelength in order to generate the holographic three dimensional image 114 using the hologram 110. The disclosed embodiments and principals of the present invention can be readily and appropriately adapted to create different kinds of holograms known in the art.

Figure 2:
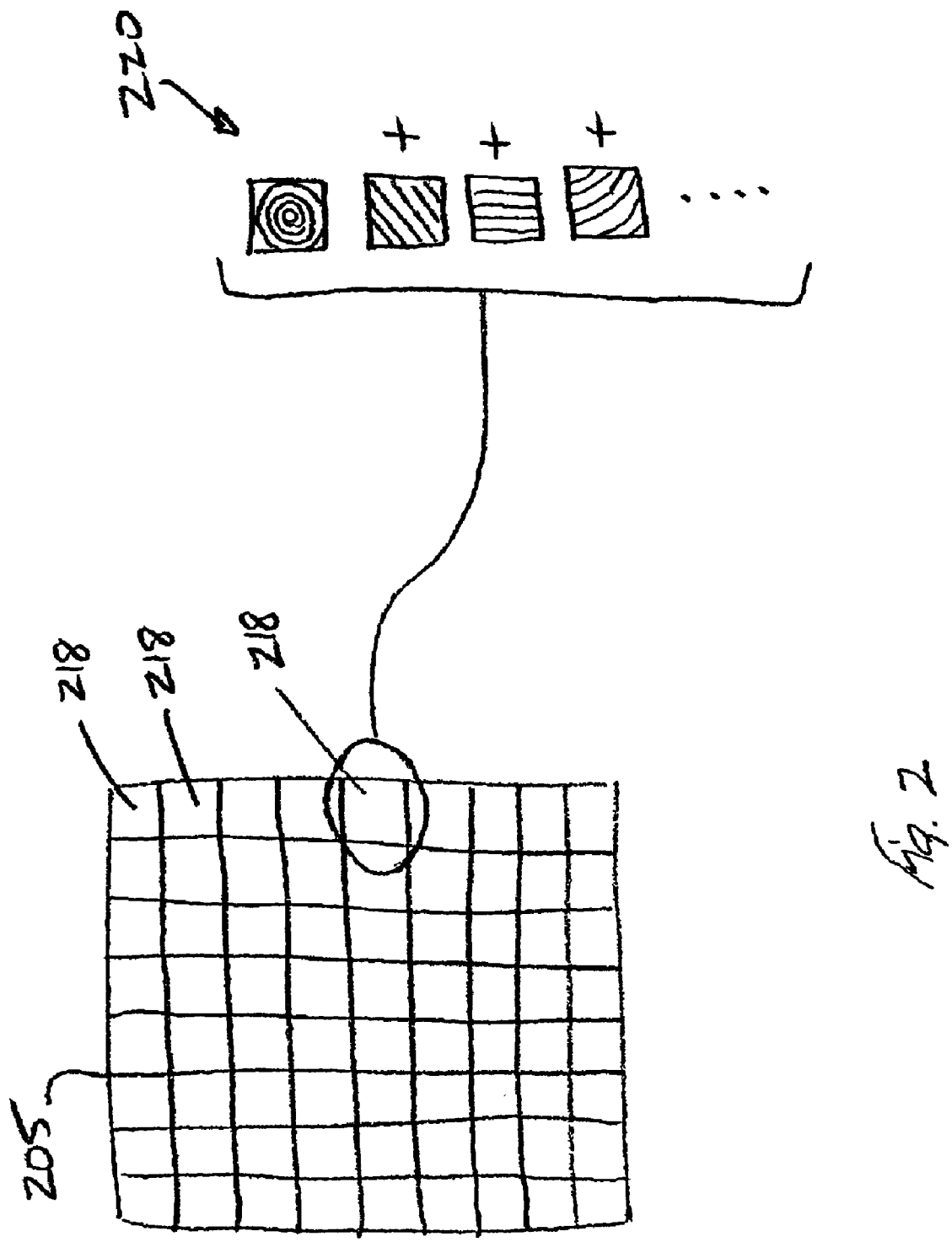
FIG. 2 illustrates a technique of partitioning a computed interference pattern and then representing each partition as a weighted sum of basis interference patterns.

FIG. 2 illustrates a computational technique that can be used to efficiently transfer the holographic interference pattern data from the computer 104 to the printer 108, and which can also increase the operational efficiency of the printer 108. In particular, the computed holographic interference pattern is partitioned into partitions or segments 218. The interference pattern for each pixel is then separately represented, for example as a weighted sum of basis interference patterns. An example set 220 of basis interference patterns is shown FIG. 2 to illustrate this concept. The theory and practice of representing an interference pattern using a set of basis interference patterns is known in the art, and thus sets of interference patterns and such are not discussed in greater detail here.

In accordance with an exemplary embodiment of the invention, each partition 218 of the computed holographic interference pattern 205 is represented as a weighted sum of basis interference patterns. For example, if the basis patterns are called $\{B_0, B_1, B_2, \ldots, B_n\}$ then each partition can be expressed as $w_0 B_0 + w_1 B_1 + \ldots + w_N B_N$, where $w_0, w_1, \ldots w_N$ are numbers between 0 and 1. One or more sets of basis patterns can be stored in the printer and can be the same for each pixel, so that it is sufficient to transmit only the coefficients $w_0, w_1, \ldots$ for each partition to the printer. This simplifies computation and reduces bandwidth necessary to transmit the information from the computer 104 to the printer 108. The computation can be performed using the principles of quantum electrodynamics.

Other appropriate compression algorithms and/or data transmission protocols can be used to convey the holographic interference pattern data from the computer 104 to the printer 108.

Figure 3:
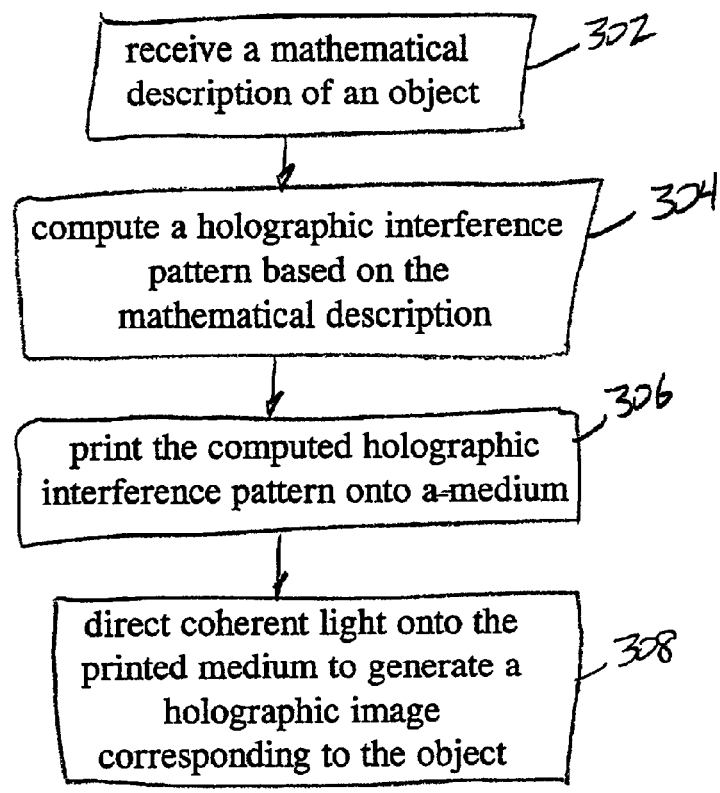
FIG. 3 describes a process for generating and storing a holographic interference pattern, in accordance with an embodiment of the invention.

FIG. 3 describes a method in accordance with an exemplary embodiment of the invention, which can be used with the system shown in FIG. 1. In step 302 a mathematical description of an object is received. From step 302 control proceeds to step 304, where a holographic interference pattern is computed based on the mathematical description of the object. From step 304, control proceeds to step 306 where the computed holographic interference pattern is printed onto a medium, or otherwise fixed in or on the medium. From step 306, control proceeds to step 308 where a holographic image corresponding to the object is generated by directing light, for example coherent light, onto the medium including the holographic interference pattern.

Figure 4:
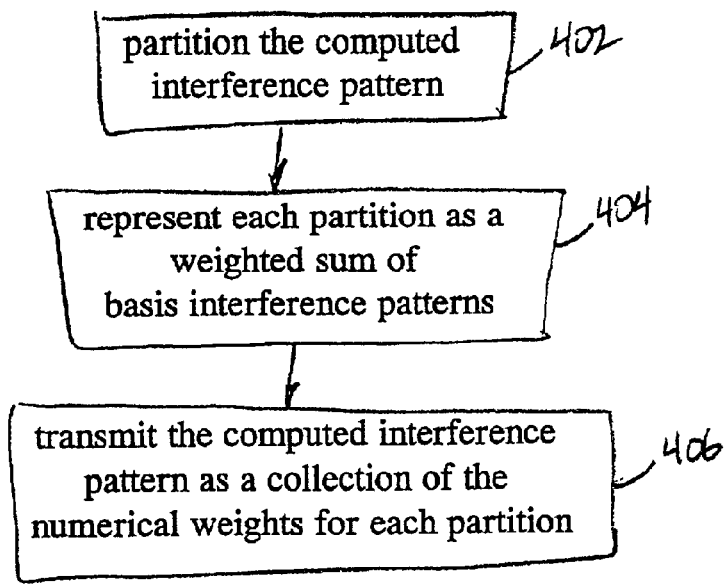
FIG. 4 describes a sub-process for partitioning a computed interference pattern and then representing each partition as a weighted sum of basis interference patterns, in accordance with an embodiment of the invention.

FIG. 4 illustrates a method in accordance with the technique described in FIG. 2. In step 402, the computed interference pattern is partitioned. From step 402, control proceeds to step 404 where each partition is represented as a weighted sum of basis interference patterns. From step 404, control proceeds to step 406 where the computed interference pattern is transmitted as a collection of the numerical weights of the basis interference patterns for each partition. The method described in FIG. 4 can be appropriately combined with the method described in FIG. 3.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalence thereof are intended to be embraced therein.

What is claimed is:

1. A method for generating a hologram, comprising the steps of:

determining a holographic interference pattern in response to a description of an object;

partitioning the holographic interference pattern into a set of partitions;

determining a representation of the interference pattern for each partition;

printing the holographic interference pattern onto a transparent print medium in response to the representations;

directing a light beam onto the transparent print medium such that the holographic interference pattern in the transparent print medium modifies the light beam to provide a person viewing the transparent print medium with a three-dimensional image of the object.

2. The method of claim 1, wherein for each partition the step of determining a representation includes the steps of:

determining a weight for each of a set of basis interference patterns;

combining the basis interference patterns according to the weights.

3. The method of claim wherein the step of printing includes the steps of:

storing the basis interference patterns in a printer;

transferring the weights to the printer such that the printer performs the step of combining the basis interference patterns according to the weights.

4. The method of claim 1, wherein the step of printing includes the step transferring the representations to the printer such that the printer prints the representation for each partition onto the transparent medium.

5. An apparatus for generating a hologram, comprising:

means for determining a holographic interference pattern in response to a description of an object;

means for partitioning the holographic interference pattern into a set of partitions;

means for determining a representation of the interference pattern for each partition;

means for printing the holographic interference pattern onto a transparent print medium in response to the representations;

means for direct ng a light beam onto the transparent print medium such that the holographic interference pattern in the transparent print medium modifies the light beam to provide a person viewing the transparent print medium with a three-dimensional image of the object.

6. The apparatus of claim 5, wherein the means for determining a representation includes:

means for determining a weight for each of a set of basis interference patterns;

means for combining the basis interference patterns according to the weights.

7. The apparatus of claim wherein the means for printing includes:

means for storing the basis interference patterns in a printer;

means for transforming the weights to the printer such that the printer performs the step of combining the basis interference patterns according to the weights.

8. The apparatus of claim 5, wherein the means for printing includes means for transferring the representations to the printer such that the printer prints the representation for each partition onto the transparent medium.

9. A system for providing a hologram, comprising:

printer that stores a set of basis interference patterns;

computer that performs the steps of determining a holographic interference pattern in response to a description of an object and determining a set of weights for the basis interference patterns in response to the holographic interference pattern and transferring the weights to the printer such that the printer prints the holographic interference pattern onto a transparent print medium using the basis interference patterns in response to the weights.

10. The system of claim 9, further comprising a light source that directs a light beam onto the transparent print medium such that the holographic interference pattern in the transparent print medium modifies the light beam to provide a person viewing the transparent print medium with a three-dimensional image of the object.

11. The system of claim 10, wherein the printer reconstructs the holographic interference pattern by performing the step of combining the basis patterns according to the weights.

* * * * *